US012584647B2

(12) United States Patent
Misra et al.

(10) Patent No.: US 12,584,647 B2
(45) Date of Patent: Mar. 24, 2026

(54) METHOD AND SYSTEM FOR JOINTLY CONTROLLING ELECTRIC VEHICLE-HEATING, VENTILATION, AND AIR CONDITIONING SYSTEM OF BUILDING

(71) Applicant: Tata Consultancy Services Limited, Mumbai (IN)

(72) Inventors: Prasant Kumar Misra, Bangalore (IN); Ajay Narayanan, Bangalore (IN); Srinarayana Nagarathinam, Chennai (IN); Arunchandar Vasan, Chennai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 84 days.

(21) Appl. No.: 18/659,996

(22) Filed: May 9, 2024

(65) Prior Publication Data

US 2024/0384885 A1 Nov. 21, 2024

(30) Foreign Application Priority Data

May 16, 2023 (IN) .............................. 202321034357

(51) Int. Cl.
F24F 11/47 (2018.01)
B60H 1/00 (2006.01)
(Continued)

(52) U.S. Cl.
CPC .......... F24F 11/47 (2018.01); B60H 1/00392 (2013.01); B60H 1/0073 (2019.05); (Continued)

(58) Field of Classification Search
CPC ........ F24F 11/47; F24F 11/64; F24F 2110/12; F24F 2120/10; F24F 2140/60; (Continued)

(56) References Cited

U.S. PATENT DOCUMENTS

| | | | | |
|---|---|---|---|---|
| 9,026,347 B2 * | 5/2015 | Gadh | ...................... | B60L 53/67 |
| | | | | 320/132 |
| 10,361,584 B2 * | 7/2019 | Song | ...................... | H02J 3/003 |

(Continued)

FOREIGN PATENT DOCUMENTS

| | | | | |
|---|---|---|---|---|
| EP | 2879261 A1 * | 6/2015 | ............. | F24F 11/64 |
| EP | 2708403 B1 * | 8/2025 | ............. | H02J 3/003 |
| KR | 20180053453 A * | 5/2018 | ............. | G06Q 10/04 |

OTHER PUBLICATIONS

"Nguyen, D., et. al.; Joint Optimization of Electric Vehicle and Home Energy Scheduling Considering User Comfort Preference; Jan. 2014; IEEE Transactions on Smart Grid, vol. 5" (Year: 2014).*
(Continued)

*Primary Examiner* — Ramya P Burgess
*Assistant Examiner* — Christopher R Cardimino
(74) *Attorney, Agent, or Firm* — Finnegan, Henderson, Farabow, Garrett & Dunner, LLP

(57) ABSTRACT

Current approaches for minimizing energy requirement of buildings are not designed to handle multi-input multi-output systems, such as electric vehicle-heating, ventilation, and air conditioning (EV-HVAC) system. Further, scalability of the solutions is another challenge. Present disclosure provides method and system for jointly controlling EV-HVAC system of a building. The system utilizes the potential of electric vehicle (EVs) in building energy management by treating EVs as buffers with random availability. The system performs EV-HVAC joint control that scales seamlessly with increasing EVs while respecting both thermal constraints of HVAC and state of charge (SoC) constraints of EV users.

9 Claims, 4 Drawing Sheets

(51) Int. Cl.

| | |
|---|---|
| *F24F 11/64* | (2018.01) |
| *F24F 110/12* | (2018.01) |
| *F24F 120/10* | (2018.01) |
| *F24F 140/60* | (2018.01) |

(52) U.S. Cl.
CPC ........... *F24F 11/64* (2018.01); *F24F 2110/12* (2018.01); *F24F 2120/10* (2018.01); *F24F 2140/60* (2018.01)

(58) Field of Classification Search
CPC .............. B60H 1/00392; B60H 1/0073; B60H 1/00428; B60L 1/003; B60L 53/62; B60L 1/06; B60L 53/14; B60L 2240/662; B60L 2240/72; B60L 53/665; B60L 53/68; B60L 55/00; H02J 2310/12; H02J 3/14; H02J 3/322
See application file for complete search history.

(56) References Cited

U.S. PATENT DOCUMENTS

| | | | | |
|---|---|---|---|---|
| 11,014,466 | B2 * | 5/2021 | Sinha | B60L 53/64 |
| 11,436,691 | B2 * | 9/2022 | Dong | G06Q 30/0206 |
| 11,610,214 | B2 * | 3/2023 | Bian | G06N 3/0499 |
| 12,013,673 | B2 * | 6/2024 | Huber | G06N 7/01 |
| 2011/0204720 | A1 * | 8/2011 | Ruiz | B60L 1/003 |
| | | | | 307/66 |
| 2014/0249680 | A1 * | 9/2014 | Wenzel | G05F 1/66 |
| | | | | 700/276 |
| 2020/0059098 | A1 * | 2/2020 | Dong | H02S 10/10 |
| 2021/0003308 | A1 * | 1/2021 | Venne | G05B 19/042 |
| 2024/0330396 | A1 * | 10/2024 | Ye | G06F 17/10 |

OTHER PUBLICATIONS

"Nagarathinam, S; et. al.; MARCO—Multi-Agent Reinforcement learning based Control of building HVAC systems; Jun. 2020; e-Energy'20, Jun. 22-26, 2020, Virtual Event, Australia" (Year: 2020).*

Svetozarevic, B. et al., "Data-driven control of room temperature and bidirectional EV charging using deep reinforcement learning: Simulations and experiments", Title of the item: Applied Energy, Date: 2022, vol. 307, Publisher: Elsevier, Link: https://www.sciencedirect.com/science/article/pil/60308261921014046.

Nguyen, Duong Tung et al., "Joint Optimization of Electric Vehicle and Home Energy Scheduling Considering User Comfort Preference", Title of the item: IEEE Transactions on Smart Grid, Date: 2013, vol. 5; Issue: 1, Publisher: IEEE, Link: https://citeseerx.ist.psu.edu/document?repid=rep1&type=pdf&doi=65ad7b593bd366c5bdb319fbearf345a70d96b0ac.

Tanguy, Kevin et al., "Optimization model and economic assessment of collaborative charging using Vehicle-to-Building", Title of the item: Sustainable Cities and Society, Date: 2016, vol. 26, Publisher: Elsevier, Link: https://maximedubois.ca/wp-content/uploads/2019/01/11_Optimization-model-and-economic.pdf.

Borge-Diez, David et al., "Combined vehicle to building (V2B) and vehicle to home (V2H) strategy to increase electric vehicle market share", Title of the item: Energy, Date: 2021, vol. 237, Publisher: Elsevier, Link: https://www.sciencedirect.com/science/pii/S0360544221018569.

* cited by examiner receiving, by a joint control system via one or more hardware processors, sensory information associated with a building, and pricing information from a building management system (BMS) —— 502 determining, by the joint control system via the one or more hardware processors, an electric vehicle (EV) action to be performed on each EV of one or more EVs based, at least in part, on the received sensory information and the pricing information using a trained EV agent, wherein the EV action comprises one of a: charging action; and discharging action —— 504 determining, by the joint control system via the one or more hardware processors, a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV —— 506 sending, by the joint control system via the one or more hardware processors, the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system —— 508

FIG. 5

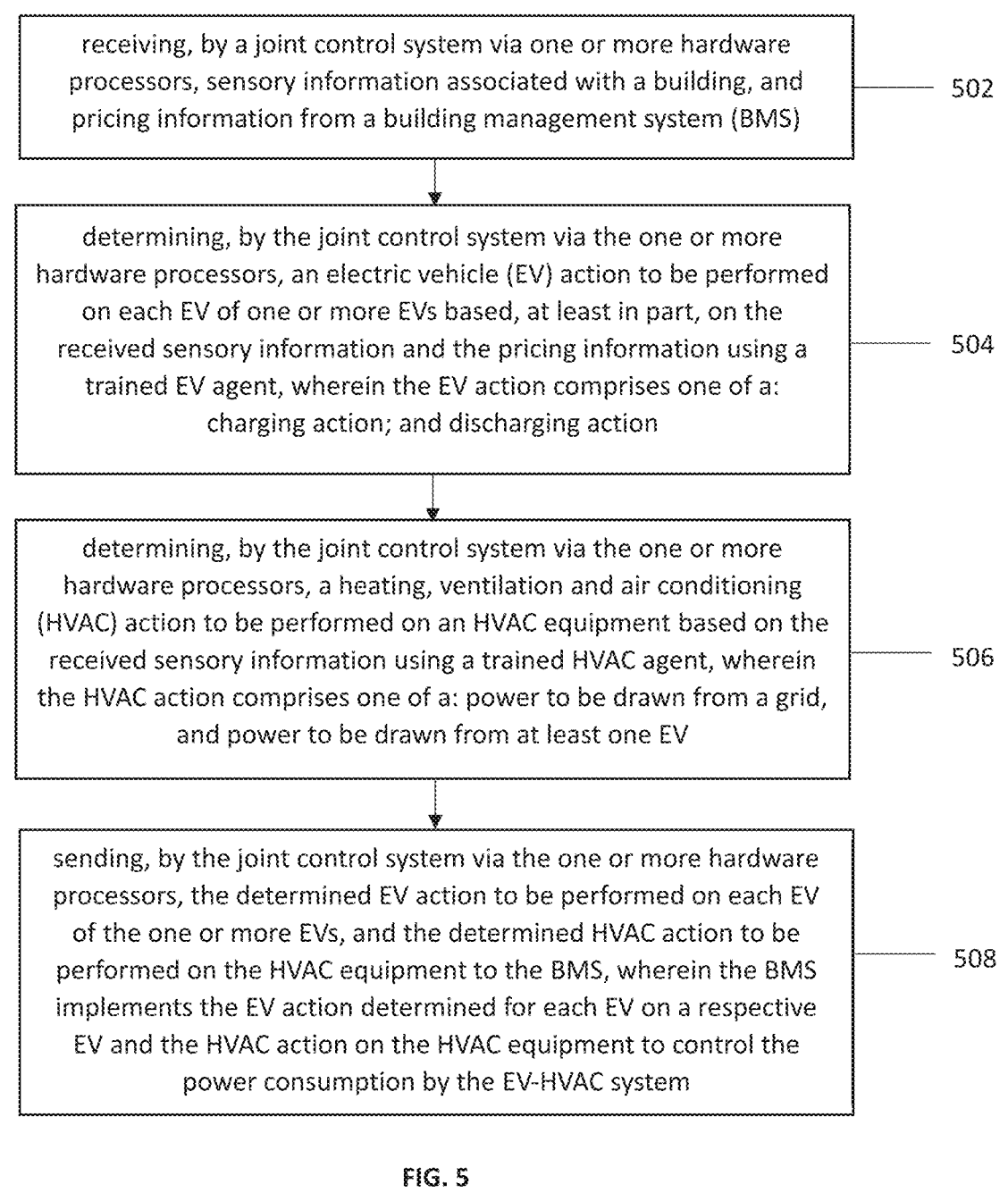

METHOD AND SYSTEM FOR JOINTLY CONTROLLING ELECTRIC VEHICLE-HEATING, VENTILATION, AND AIR CONDITIONING SYSTEM OF BUILDING

PRIORITY CLAIM

This U.S. patent application claims priority under 35 U.S.C. § 119 to: India Application No. 202321034357, filed on May 16, 2023. The entire contents of the aforementioned application are incorporated herein by reference.

TECHNICAL FIELD

The disclosure herein generally relates to power management, and, more particularly, to a method and a system for jointly controlling electric vehicle-heating, ventilation, and air conditioning system of a building.

BACKGROUND

Buildings account for majority of the total energy consumption in a country as heating, ventilation, and air conditioning (HVAC) system used for managing electricity requirement of buildings accounts for nearly 50% of building's total energy consumption. While the HVAC system is an age-old energy load on buildings, the onsite electric vehicle (EV) charging is likely to be a significant new load for buildings due to rapid EV adoption.

EV adoption is increasing at a higher rate as consumers have started giving importance to sustainable energy solutions. As a result of this, EVs are now considered as the new load for buildings as users like to seamlessly charge their EVs during working hours.

Further, the working hours of the EV users overlap with the peak time of-day pricing of the electricity grid which results in increased energy costs. So, it gets difficult for the facility managers to manage the energy demands of the building with such increased costs. Additionally, EV power demand is likely more stochastic due to user movement than a primarily ambient weather-driven HVAC load which makes it further difficult to manage the power demand coming from EVs.

SUMMARY

Embodiments of the present disclosure present technological improvements as solutions to one or more of the above-mentioned technical problems recognized by the inventors in conventional systems. For example, in one aspect, there is provided a processor implemented method for jointly controlling electric vehicle-heating, ventilation, and air conditioning system of a building. The method comprises receiving, by a joint control system via one or more hardware processors, sensory information associated with a building, and pricing information from a building management system (BMS); determining, by the joint control system via the one or more hardware processors, an electric vehicle (EV) action to be performed on each EV of one or more EVs based, at least in part, on the received sensory information and the pricing information using a trained EV agent, wherein the EV action comprises one of a: charging action; and discharging action; determining, by the joint control system via the one or more hardware processors, a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV; and sending, by the joint control system via the one or more hardware processors, the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system.

In an embodiment, the sensory information includes one or more of: a current time, a current room temperature, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system. The pricing information comprises a cost per unit of electricity at the current time.

In an embodiment, wherein the step of determining, by the joint control system via the one or more hardware processors, the EV action to be performed on each EV of the one or more EVs based, at least in part, on the received sensory information and the pricing information using the trained EV agent is preceded by: determining, by the joint control system via the one or more hardware processors, whether the trained EV agent is available; upon determining that the trained EV agent is not available, training, by the joint control system via the one or more hardware processors, an EV agent based on the sensory information and the pricing information by: accessing, by the joint control system via the one or more hardware processors, the current SoC of each EV, the departure time of each EV, a required SoC at the departure time of each EV, the cost per unit of electricity at the current time and an EV proxy for a time-of-day pattern in arrival of EVs; computing, by the joint control system via the one or more hardware processors, a slack variable for each EV based, at least in part, on the departure time of the respective EV and the required SoC at the departure time for the respective EV; computing, by the joint control system via the one or more hardware processors, a state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern, wherein the state space value computed for each EV is used by the EV agent to decide an action value for the respective EV, and wherein the action value is one of: a charging rate, and a discharging rate; implementing, by the joint control system via the one or more hardware processors, an action on each EV based on the action value decided by the EV agent for the respective EV; computing, by the joint control system via the one or more hardware processors, a reward for each EV based on the action implemented on the respective EV using an EV reward algorithm, wherein the reward comprises one of: penalizing the EV agent in case slack variable constraints are not followed for the respective EV, and awarding the EV agent in case the slack variable constraints are followed for the respective EV, and wherein the awarding of the EV agent represents that the EV agent is learning to minimize total cost of power drawn by the EVs in the EV-HVAC system; and training, by the joint control system via the one or more hardware processors, the EV agent based on the computed reward using an EV training algorithm.

In an embodiment, wherein the step of determining, by the joint control system via the one or more hardware processors, the HVAC action to be performed on the HVAC equipment based on the received sensory information using the trained HVAC agent is preceded by: determining, by the joint control system via the one or more hardware processors, whether the trained HVAC agent is available; upon determining that the trained HVAC agent is not available, training, by the joint control system via the one or more hardware processors, an HVAC agent based, at least in part, on the sensory information, the pricing information and a discharge power of an EV system by: computing, by the joint control system via the one or more hardware processors, a state space for the HVAC equipment based, at least in part, on the current room temperature, the ambient temperature, the discharge power of the EV system and a HVAC proxy for a time-of-day pattern in ambient temperature, wherein the state space computed for the HVAC equipment is used by the HVAC agent to decide an action to be taken on the HVAC equipment, and wherein the action is one of a: power to be drawn from the grid, and power to be drawn from the EV system; implementing, by the joint control system via the one or more hardware processors, the decided action on the HVAC equipment; computing, by the joint control system via the one or more hardware processors, an HVAC reward for the implemented action using an HVAC reward algorithm, wherein the HVAC reward comprises one of: penalizing the HVAC agent in case the current room temperature is outside a recommended user comfort range, and awarding the HVAC agent in case the temperature is within the recommended user comfort range, and wherein the awarding of the HVAC agent represents that the HVAC agent is learning to minimize total cost of power drawn from the grid for HVAC operation of the building; and training, by the joint control system via the one or more hardware processors, the HVAC agent based on the computed HVAC reward using an HVAC training algorithm.

In another aspect, there is provided a joint control system for jointly controlling electric vehicle-heating, ventilation, and air conditioning system of a building. The system comprises a memory storing instructions; one or more communication interfaces; and one or more hardware processors coupled to the memory via the one or more communication interfaces, wherein the one or more hardware processors are configured by the instructions to: receive sensory information associated with a building, and pricing information from a building management system; determine an electric vehicle (EV) action to be performed on each EV of one or more EVs based, at least in part, on the received sensory information and the pricing information using a trained EV agent, wherein the EV action comprises one of a: charging action; and discharging action; determine a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV; and send the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system.

In an embodiment, the sensory information includes one or more of: a current time, a current room temperature, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system. The pricing information includes a cost per unit of electricity at the current time.

In an embodiment, prior to determining the EV action to be performed on each EV of the one or more EVs based, at least in part, on the received sensory information and the pricing information using the trained EV agent, the one or more hardware processors are configured by the instructions to determine whether the trained EV agent is available; upon determining that the trained EV agent is not available, train an EV agent based on the sensory information and the pricing information by: accessing the current SoC of each EV, the departure time of each EV, a required SoC at the departure time of each EV, the cost per unit of electricity at the current time and an EV proxy for a time-of-day pattern in arrival of EVs; computing a slack variable for each EV based, at least in part, on the departure time of the respective EV and the required SoC at the departure time for the respective EV; computing a state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern, wherein the state space value computed for each EV is used by the EV agent to decide an action value for the respective EV, and wherein the action value is one of: a charging rate, and a discharging rate; implementing an action on each EV based on the action value decided by the EV agent for the respective EV; computing a reward for each EV based on the action implemented on the respective EV using an EV reward algorithm, wherein the reward comprises one of: penalizing the EV agent in case slack variable constraints are not followed for the respective EV, and awarding the EV agent in case the slack variable constraints are followed for the respective EV, and wherein the awarding of the EV agent represents that the EV agent is learning to minimize total cost of power drawn by the EVs in the EV-HVAC system; and training the EV agent based on the computed reward using an EV training algorithm.

In an embodiment, prior to determining the HVAC action to be performed on the HVAC equipment based on the received sensory information using the trained HVAC agent, the one or more hardware processors are configured by the instructions to: determine whether the trained HVAC agent is available; upon determining that the trained HVAC agent is not available, train an HVAC agent based, at least in part, on the sensory information, the pricing information and a discharge power of an EV system by: computing a state space for the HVAC equipment based, at least in part, on the current room temperature, the ambient temperature, the discharge power of the EV system and a HVAC proxy for a time-of-day pattern in ambient temperature, wherein the state space computed for the HVAC equipment is used by the HVAC agent to decide an action to be taken on the HVAC equipment, and wherein the action is one of a: power to be drawn from the grid, and power to be drawn from the EV system; implementing the decided action on the HVAC equipment; computing an HVAC reward for the implemented action using an HVAC reward algorithm, wherein the HVAC reward comprises one of: penalizing the HVAC agent in case the current room temperature is outside a recommended user comfort range, and awarding the HVAC agent in case the temperature is within the recommended user comfort range, and wherein the awarding of the HVAC agent represents that the HVAC agent is learning to minimize total cost of power drawn from the grid for HVAC operation of the building; and training the HVAC agent based on the computed HVAC reward using an HVAC training algorithm.

In yet another aspect, there are provided one or more non-transitory machine-readable information storage mediums comprising one or more instructions which when executed by one or more hardware processors cause a method for jointly controlling electric vehicle-heating, ventilation, and air conditioning system of a building. The method comprises receiving, by a joint control system via one or more hardware processors, sensory information associated with a building, and pricing information from a building management system (BMS); determining, by the joint control system via the one or more hardware processors, an electric vehicle (EV) action to be performed on each EV of one or more EVs based, at least in part, on the received sensory information and the pricing information using a trained EV agent, wherein the EV action comprises one of a: charging action; and discharging action; determining, by the joint control system via the one or more hardware processors, a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV; and sending, by the joint control system via the one or more hardware processors, the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system.

In an embodiment, the sensory information includes one or more of: a current time, a current room temperature, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system. The pricing information comprises a cost per unit of electricity at the current time.

In an embodiment, wherein the step of determining, by the joint control system via the one or more hardware processors, the EV action to be performed on each EV of the one or more EVs based, at least in part, on the received sensory information and the pricing information using the trained EV agent is preceded by: determining, by the joint control system via the one or more hardware processors, whether the trained EV agent is available; upon determining that the trained EV agent is not available, training, by the joint control system via the one or more hardware processors, an EV agent based on the sensory information and the pricing information by: accessing, by the joint control system via the one or more hardware processors, the current SoC of each EV, the departure time of each EV, a required SoC at the departure time of each EV, the cost per unit of electricity at the current time and an EV proxy for a time-of-day pattern in arrival of EVs; computing, by the joint control system via the one or more hardware processors, a slack variable for each EV based, at least in part, on the departure time of the respective EV and the required SoC at the departure time for the respective EV; computing, by the joint control system via the one or more hardware processors, a state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern, wherein the state space value computed for each EV is used by the EV agent to decide an action value for the respective EV, and wherein the action value is one of: a charging rate, and a discharging rate; implementing, by the joint control system via the one or more hardware processors, an action on each EV based on the action value decided by the EV agent for the respective EV; computing, by the joint control system via the one or more hardware processors, a reward for each EV based on the action implemented on the respective EV using an EV reward algorithm, wherein the reward comprises one of: penalizing the EV agent in case slack variable constraints are not followed for the respective EV, and awarding the EV agent in case the slack variable constraints are followed for the respective EV, and wherein the awarding of the EV agent represents that the EV agent is learning to minimize total cost of power drawn by the EVs in the EV-HVAC system; and training, by the joint control system via the one or more hardware processors, the EV agent based on the computed reward using an EV training algorithm.

In an embodiment, wherein the step of determining, by the joint control system via the one or more hardware processors, the HVAC action to be performed on the HVAC equipment based on the received sensory information using the trained HVAC agent is preceded by: determining, by the joint control system via the one or more hardware processors, whether the trained HVAC agent is available; upon determining that the trained HVAC agent is not available, training, by the joint control system via the one or more hardware processors, an HVAC agent based, at least in part, on the sensory information, the pricing information and a discharge power of an EV system by: computing, by the joint control system via the one or more hardware processors, a state space for the HVAC equipment based, at least in part, on the current room temperature, the ambient temperature, the discharge power of the EV system and a HVAC proxy for a time-of-day pattern in ambient temperature, wherein the state space computed for the HVAC equipment is used by the HVAC agent to decide an action to be taken on the HVAC equipment, and wherein the action is one of a: power to be drawn from the grid, and power to be drawn from the EV system; implementing, by the joint control system via the one or more hardware processors, the decided action on the HVAC equipment; computing, by the joint control system via the one or more hardware processors, an HVAC reward for the implemented action using an HVAC reward algorithm, wherein the HVAC reward comprises one of: penalizing the HVAC agent in case the current room temperature is outside a recommended user comfort range, and awarding the HVAC agent in case the temperature is within the recommended user comfort range, and wherein the awarding of the HVAC agent represents that the HVAC agent is learning to minimize total cost of power drawn from the grid for HVAC operation of the building; and training, by the joint control system via the one or more hardware processors, the HVAC agent based on the computed HVAC reward using an HVAC training algorithm.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 5 illustrates an exemplary flow diagram of a method for jointly controlling electric vehicle-heating, ventilation, and air conditioning system of the building using the system of FIG. 1, in accordance with an embodiment of the present disclosure.

DETAILED DESCRIPTION

Figure 1:
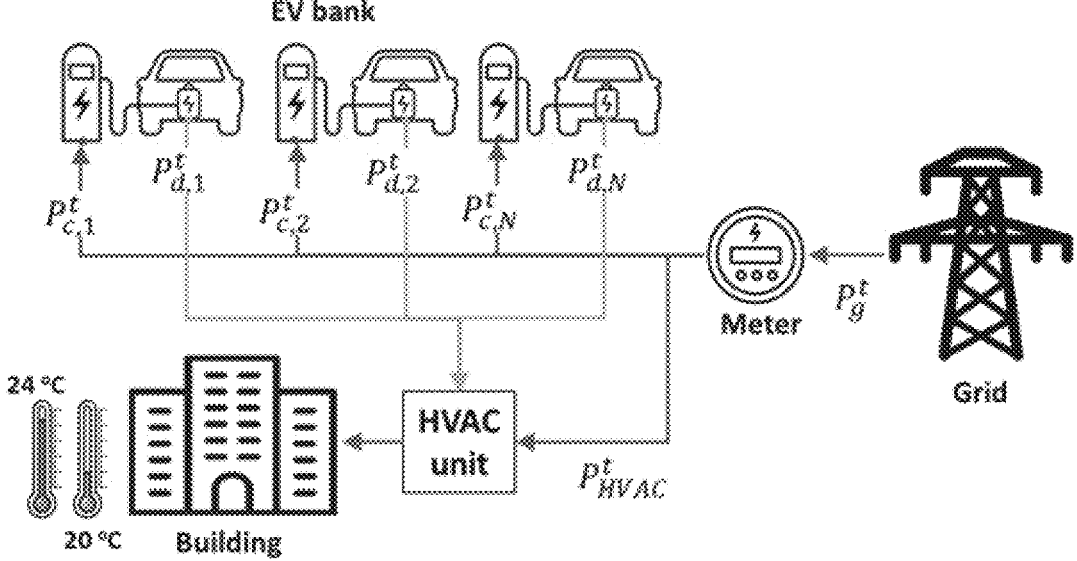
FIG. 1 illustrates a schematic representation of power distribution in a building, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

As discussed earlier, rapid adoption of electric vehicles (EVs) can result in a significant new load for buildings as EV users prefer to charge their vehicles when they are parked in office. Further, the working hours of users overlap with the peak time-of-day pricing, which further increases the building energy management cost as along with HVAC energy requirement, the EVs energy requirement also needs to be managed.

In past, many rule based techniques have been introduced to minimize energy requirement of buildings. In rule based techniques, the temperature setpoints and ventilation requirements are simply adjusted based on user count, thus a significant amount of energy can be saved. However, these techniques are reactive and are not designed to handle multi-input multi-output systems (such as EV-HVAC system) as a result they give a sub-optimal performance. Further, model predictive control (MPC) systems have been introduced as they provide better operational robustness than rule-based controllers. But they need an accurate and well-calibrated system model to ensure optimal performance besides requiring period model calibration to factor in the uncertainties. Also, the computation time required for optimization with non-linear constraints and increasing number of decision variables make the approach infeasible for real-time control.

In another technique, the authors proposed a joint scheduling strategy of HVAC and on-site battery storage system with the battery capable of discharging power to a HVAC system at peak hours to reduce the overall energy bill. However, these techniques did not include use of EV system and their state of charging (SoC) requirements. The challenge that is observed in the above technique is that it is a costly setup as the cost of the battery is directly proportional to capacity of the battery. Further, the batteries need to be changed frequently, which adds to the running cost of the system. Additionally, unlike on-site battery storage system, which is static and always available, EV systems present a more dynamic load (charging/discharging is strongly dependent on the EVs arrival time, departure time, arrival SoC, and departure SoC) and dynamic storage buffer size, thereby making the above technique unusable for EV-HVAC systems.

EVs have the potential to help in building energy management as their demand is quiet flexible. EV users just want the EV to be charged to a desired state of charge (SoC) by their departure time, such EV users do not care about the SoC during the course of the day. Further, EVs can also discharge energy when the user does not need the vehicle, thereby making it eligible to work as a distributed energy resource (DER) during the day. So, EVs can be used as DER for building energy management by charging/discharging the EVs when the grid price is lower/higher, respectively. Thus, joint control of HVAC and EVs, if properly done, can help in reducing building energy costs under the time-of-day electricity pricing regime.

However, available techniques may have failed to consider discharging availability of EVs that makes them a good candidate for a DER facility and HVAC management.

So, the embodiments of the present disclosure tried to utilize the potential of EVs in building energy management by treating EVs as buffers with random availability. In particular, EV discharging may be used by the HVAC system of the building at peak hours while respecting the EV system requirements.

More specifically, embodiments of the present disclosure overcome the above-mentioned disadvantages by providing a method and a system for jointly controlling electric vehicle-heating, ventilation, and air conditioning system of a building. The system performs EV-HVAC joint control that scales seamlessly with increasing EVs while respecting both thermal constraints of HVAC and state of charge (SoC) constraints of EV users. In particular, the system performs optimal actions i.e., it decides EVs charging or discharging rates and HVAC power to be drawn from the grid such that it minimizes the overall energy consumption of the building while maintaining the temperature within the acceptable comfort limit in user working spaces present in the building.

For performing EV-HVAC joint control, the present disclosure considers a trained HVAC agent for the HVAC system and a trained EV agent for the EVs. The HVAC agent is trained with constraints on user comfort, physical equations for heat transfer and electricity prices to minimize the power drawn from the grid during peak hours. Similarly, the EV agent is trained with constraints on SoC and slack of EVs, and electricity prices to ensure required SoC is maintained at the departure time of each EV. So, in particular, a joint control problem is formulated to minimize the overall building energy consumption.

The system, at every timestep, receives the sensory information associated with a building i.e., a current state of a building from a building management system (BMS) as an input. The system then uses the trained EV agent to decide whether the power is to be discharged/charged by each EV. Thereafter, the system uses the trained HVAC agent to determine whether the power is to be drawn from the grid by an HVAC equipment (interchangeably referred as HVAC system/unit) in that particular timestep. Further, the system uses the trained HVAC agent to determine whether the power is to be drawn from the grid by the HVAC equipment. Finally, the system shares the determined information with the BMS which then implements the determined actions.

To understand the working of the system of the present disclosure, formulation of the joint control problem which will be solved by the system is explained first as the system tried to overcome the challenges involved in solving the joint control problem.

Consider a building/facility with an HVAC unit and N EVs, each with a dedicated charging station. The system of the present disclosure assume that an EV is always plugged in when at the charging station. The joint control problem that needs to be solved is that the EVs charging/discharging rates and HVAC power is to be jointly controlled such that the total energy bill is minimized while keeping the user comfort temperature within acceptable limits and meeting the departure SoC requirements of the EVs over the control horizon. Mathematically, the joint control problem can be stated as:

$$\min_{P_{EV}, P_{HVAC}} C_T = \sum_t^{t+\tau \cdot \Delta t} p^t \cdot p_g^t \cdot \Delta t \qquad \text{equation (1)}$$

Where, $p_g^t = [p_{HVAC}^t + \Sigma_1^N \lambda_i^t \cdot p_{c,i}^t]$     equation (2), $P_{EV}$ and $P_{HVAC}$ are vectors of EV charging, EV discharging rate and HVAC power drawn from the grid over $\tau$ prediction time step, $C_T$ is total energy cost over [t, t+$\tau$·$\Delta t$], and $p^t$ is the cost per unit of energy (kWh) at time t.

The EV charging power from the grid is $p_{c,i}^t = [p_i^t, 0]$ (only positive values in $P_{EV}$ are considered). The $p_{HVAC}^t$, the power drawn by HVAC equipment from the grid at t is also positive. Hence, $p_g^t$ in equation (2) is always positive. It should be noted that in the problem formulation, there is no power given back to the grid (vehicle to grid (V2G)), and EV discharge $p_{d,i}^t = [p_i^t, 0]$, if any is consumed only by the HVAC system of the building. Further, $\lambda_i^t$ is a binary variable denoting presence/absence of EV at the charging station as a function of time-of-day.

Now, the EV constraints that needs to be considered while solving the joint control problem are defined below.

At every time-step, the SoC evolves according to the following dynamic equation:

$$\frac{d\theta_i^t}{dt} = \frac{P_i^t}{E_i^{rated}} \forall i \in N. \qquad \text{equation (3)}$$

The SoC is bounded at all times, so $$\theta_i^{min} \le \theta_i^t \le \theta_i^{max}, \forall i \in N, \qquad \text{equation (4)}$$

10

Where, $\theta_i^{min}$ and $\theta_i^{max}$ represents minimum and maximum allowable SoC.

The charging/discharge rates are bounded as follows:

$$-P_i^{rated} \le P_i^t \le P_i^{rated}, \forall i \in N. \qquad \text{equation (5)}$$

Additionally, a slack variable, if is defined such that, $$I_i^t \ge 0, \forall i \in N \qquad \text{equation (6)}$$

The slack variable dynamically quantifies the flexibility available till the departure time and is defined as:

$$I_i^t = [t_i^d - t]^+ - \frac{(\theta_i^d - \theta_i^t) \cdot E_i^{rated}}{P_i^{rated} \cdot \eta_c}, \forall i \in N \qquad \text{equation (7)}$$

Where, $t_i^d$ and $S_i^d$ are the departure time and the required/maximum possible SoC at the departure time for EV i, $P_i^{rated}$ represents maximum charging/discharging rate of EV, $E_i^{rated}$ represents rated capacity of battery, and The charging efficiency $\eta_c$ is taken as 1

The HVAC constraints that needs to be considered while solving the joint control problem are defined below.

The user room air temperature is assumed to evolve accordingly to a following lumped thermal model, $$C_a \frac{dT_a^t}{dt} = Q_{int}^t + U_w A_w (T_\infty^t - T_a^t) - COP \cdot \left( p_{HVAC}^t - \beta_{V2B} \cdot \sum_1^N \lambda_i^t \cdot [P_i^t, 0]^- \right),$$

Where, $C_a$ and $T_a$ represents user room air capacitance and temperature, $\beta_{V2B}$ represents binary toggle for enabling/disabling vehicle to building (V2B) power flow, $Q_{int}^t$ represents internal heat load of user room at time t, $T_\infty^t$ represents ambient temperature at time t, and COP represents coefficient of performance of HVAC unit.

It should be noted that only the cooling problem is considered in HVAC management. As $[P_i^t, \theta]^-$ in the second term under 'heat removed' considers only the negative values (indicates EV discharge) and power supplied to HVAC equipment from grid $p_{HVAC}^t$ is positive, so the heat removed' terms is always positive. It should also be noted that the coefficient of performance (COP) of HVAC equipment is multiplied to convert electrical power to thermal power and $\beta_{V2B}$ determines whether to use EV discharge for HVAC or not.

Further, the HVAC power drawn is capped at the rated value, $$0 \le p_{HVAC}^t \le p_{HVAC}^{rated} \qquad \text{equation (9)}$$

The room temperature is bounded at:

$$20° \text{ C.} \le T_a^t \le 24° \text{ C.} \qquad \text{equation (10)}$$

As can be seen in above mentioned equations, they are highly non-linear. Further, the EV and the HVAC constraints are very difficult to solve optimally. Additionally, accuracy of the real-world implementation is subjected to the accuracy of the charging rate and temperature evolution models, HVAC and EVs performance models, and the associated uncertainty in the input parameters such as ambient conditions and EV arrival and departure times. Moreover, solving the joint control problem at a scale is a totally different challenge altogether.

In the present disclosure, the system uses only one common EV agent for all the EVs instead of one agent per each EV, so the system scales readily with an increasing number of EVs. Further, the system balances the HVAC and EV charging KPIs with opportunistic power routing from V2B, thereby ensuring minimized power consumption by the HVAC system during the peak time of the day.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates a schematic representation of power distribution in a building, in accordance with some embodiments of the present disclosure.

As seen in FIG. 1, a grid provides power to a heating, ventilation, and air conditioning (HVAC) equipment/unit of a building as well as to one or more EVs that are plugged to one or more EV charging stations present in the building. The building can be a commercial building or an industrial building. The one or more EV charging stations utilize the received power from the grid to charge batteries of the one or more EVs that are plugged to the one or more EV charging stations. The HVAC unit of the building is responsible for maintaining temperature within the acceptable comfort limit in user working spaces present in the building. In an embodiment, the acceptable comfort limit of temperature is considered as 20°-24° Celsius.

In at least one example embodiment, the one or more EVs that are parked in the building may be used to provide power to the HVAC unit of the building.

Figure 2:
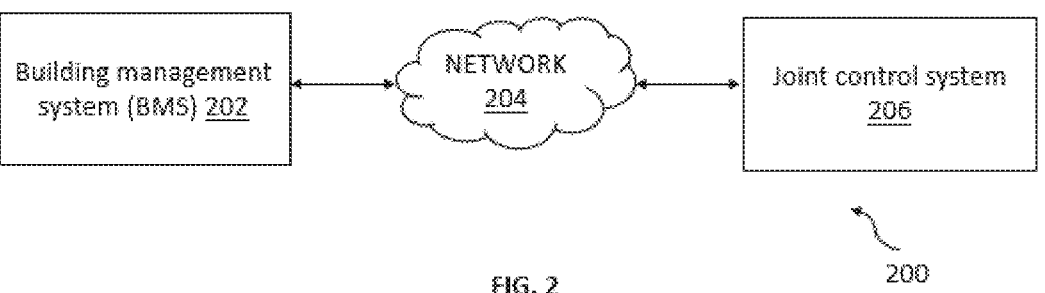
FIG. 2 illustrates an exemplary representation of an environment related to at least some example embodiments of the present disclosure.

FIG. 2 illustrates an exemplary representation of an environment 200 related to at least some example embodiments of the present disclosure. Although the environment 200 is presented in one arrangement, other embodiments may include the parts of the environment 200 (or other parts) arranged otherwise depending on, for example, arrangement of EVs, determining HVAC action etc. The environment 200 generally includes a building management system (BMS) 202, and a joint control system 206, each coupled to, and in communication with (and/or with access to) a network 204.

The network 204 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 2, or any combination thereof.

Various entities in the environment 200 may connect to the network 204 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

Various entities in the environment 200 may connect to the network 104 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

The BMS 202 is associated with a building (e.g., a commercial building or an industrial building). In an embodiment, the BMS 202 provides easy integration of EV charging infrastructure and manages all building requirements, such as HVAC, lighting, fire, security, and the like. The BMS 202 also possess EV load management capabilities along with peak shifting and vehicle to building (V2B) capabilities. In at least one example embodiment, the BMS 202 stores sensory information and pricing information. The sensory information includes one or more of a current time, a current room temperature of user working spaces present in the building, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system present in the building. The pricing information includes a cost per unit of electricity at the current time.

The joint control system 206 includes one or more hardware processors and a memory. The joint control system 206 is configured to perform one or more of the operations described herein. The joint control system 206 is configured to receive the sensory information associated with the building, and the pricing information from the BMS 202 via the network 204. The joint control system 206 then determines an electric vehicle (EV) action to be performed on each EV based on the received sensory information and the pricing information using a trained EV agent. The process of obtaining the trained EV agent is explained in detail with reference to FIG. 5. The EV action includes one of a charging action i.e., the EV needs to be charged at that particular point of time, and a discharging action i.e., the EV needs to be discharged at that particular point of time.

Thereafter, the joint control system 206 determines the heating, ventilation and air conditioning (HVAC) action to be performed on an HVAC equipment/unit based on the received sensory information using a trained HVAC agent. The process of obtaining the trained HVAC agent is explained in detail with reference to FIG. 5. The HVAC action includes one of a power to be drawn from a grid, and power to be drawn from at least one EV. Once the EV action to be performed on each EV and the HVAC action to be performed on the HVAC equipment is determined, the joint control system 206 shares action information with the BMS which them implements the required actions. The required actions ensure that the power consumption by the EV-HVAC system is minimized during peak hours while maintaining an ambient temperature at user working spaces present in the building and maintaining a required state of charge (SoC) for each EV at the time of departure from the building.

The number and arrangement of systems, and/or networks shown in FIG. 2 are provided as an example. There may be additional systems, and/or networks; fewer systems, and/or networks; different systems, and/or networks; and/or differently arranged systems, and/or networks than those shown in FIG. 2. Furthermore, two or more systems shown in FIG. 2 may be implemented within a single system, or a single system or device shown in FIG. 2 may be implemented as multiple, distributed systems. Additionally, or alternatively, a set of systems (e.g., one or more systems) of the environment 200 may perform one or more functions described as being performed by another set of systems of the environment 200 (e.g., refer scenarios described above).

Figure 3:
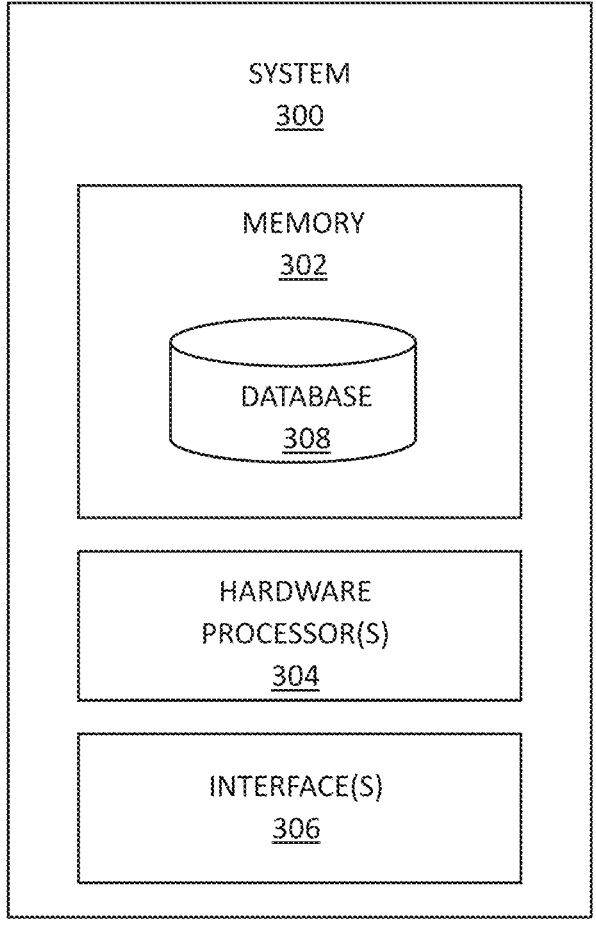
FIG. 3 illustrates an exemplary block diagram of a joint control system for jointly controlling electric vehicle-heating, ventilation, and air conditioning system of a building, in accordance with an embodiment of the present disclosure.

FIG. 3 illustrates an exemplary block diagram of a joint control system 300 for jointly controlling electric vehicle-heating, ventilation, and air conditioning (EV-HVAC) system of a building, in accordance with an embodiment of the present disclosure. In an embodiment, the joint control system 300 may also be referred as system 300 and may be interchangeably used herein. The system 300 is similar to the joint control system 106 explained with reference to FIG. 2.

In some embodiments, the system 300 is embodied as a cloud-based and/or SaaS-based (software as a service) architecture. In some embodiments, the system 300 may be implemented in a server system. In some embodiments, the system 300 may be implemented in a variety of computing systems, such as laptop computers, notebooks, hand-held devices, workstations, mainframe computers, and the like.

In an embodiment, the system 300 includes one or more processors 304, communication interface device(s) or input/output (I/O) interface(s) 306, and one or more data storage devices or memory 302 operatively coupled to the one or more processors 304. The one or more processors 304 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 300 can be implemented in a variety of computing systems, such as laptop computers, notebooks, hand-held devices, workstations, mainframe computers, servers, a network cloud and the like.

The I/O interface device(s) 306 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 302 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 308 can be stored in the memory 302, wherein the database 308 may comprise, but are not limited to sensory information, pricing information and the like. In an embodiment, the memory 302 may store information pertaining to training samples, plug and play language modeling technique, token selection criteria, and the like. The memory 302 further comprises (or may further comprise) information pertaining to input(s)/output(s) of each step performed by the systems and methods of the present disclosure. In other words, input(s) fed at each step and output(s) generated at each step are comprised in the memory 302 and can be utilized in further processing and analysis.

Figure 4:
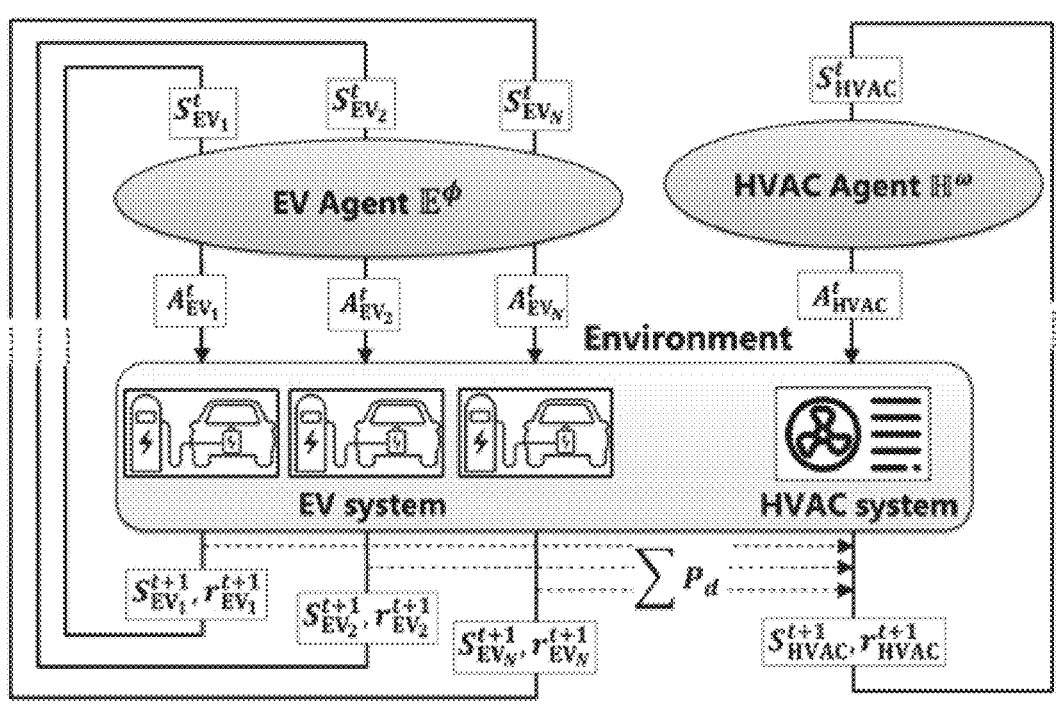
FIG. 4 is a schematic representation illustrating joint controlling of electric vehicle-heating, ventilation, and air conditioning system of the building by system of FIG. 3, in accordance with an embodiment of the present disclosure.

FIG. 4, with reference to FIGS. 1-3, is a schematic representation illustrating joint controlling of EV-HVAC system of a building by the system 300 of FIG. 3, in accordance with an embodiment of the present disclosure.

As seen in FIG. 4, the system 300 uses the trained EV agent to determine an electric vehicle (EV) action to be performed on each EV of one or more EVs. Similarly, the system 300 uses the trained HVAC agent to determine HVAC action to be performed on an HVAC equipment of the building. The determined EV action and the HVAC action are then shared with a BMS (such as the BMS 202 shown in FIG. 2). The BMS jointly implements the determined action that ensures reduced energy consumption which further reduces the building energy cost.

FIG. 5, with reference to FIGS. 1 to 4, illustrates an exemplary flow diagram of a method 500 for jointly controlling EV-HVAC system of a building using the system 300 of FIG. 3, in accordance with an embodiment of the present disclosure. In an embodiment, the system 300 comprises one or more data storage devices or the memory 302 operatively coupled to the one or more hardware processors 304 and is configured to store instructions for execution of steps of the method 500 by the one or more hardware processors 304. The steps of the method 500 of the present disclosure will now be explained with reference to the components of the system 300 as depicted in FIG. 3, and the flow diagram.

At step 502 of the method of the present disclosure, the one or more hardware processors 304 comprised in the system 300 receive sensory information associated with a building, and pricing information from a BMS, such as the BMS 302. In an embodiment, the sensory information includes one or more of a current time, a current room temperature, an ambient temperature, occupancy information, a state of charge (SoC) of each electric vehicle EV of one or more electric vehicles EVs at current time, an arrival time of each EV, a departure time of each EV, and a power drawn by an EV-HVAC system. The pricing information includes a cost per unit of electricity at the current time.

At step 504 of the present disclosure, the hardware processors 304 of the system 300 determine an EV action to be performed on each EV of one or more EVs based, at least in part, on the received sensory information and the pricing information using a trained EV agent. In an embodiment, the EV action includes one of a charging action and discharging action.

In at least one example embodiment, before using the trained EV agent, the system 300 determines whether the trained EV agent is available or not. In case the trained EV agent is available, the system 300 uses it for determining EV action for each EV of the one or more EVs. In case, the trained EV agent is not available, the system 300 first trains the EV agent based on the received sensory information and the pricing information.

In an embodiment, for training the EV agent, the system 300 first access the current state of charge (SoC) of each EV, the departure time of each EV, a required SoC at the departure time of each EV, the cost per unit of electricity at the current time and an EV proxy for a time-of-day pattern in arrival of EVs. It should be noted that the above mentioned information is accessed for a particular time t to decide the charging rate of each EV at the same time t.

The system 300 then computes a slack variable for each EV based, at least in part, on the departure time of the respective EV and the required SoC at the departure time for the respective EV. Thereafter, the system 300 computes state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern.

A state space i.e., state of EV at time t is represented as:

$$S_{EV}{}^t = \{l^t, \theta^t, \theta^d, r^d, p^t, t\}$$

Where, $l^t$ represents the slack variable computed at time t,
$\theta^t$ represents current SoC at time t,
$\theta^d$ represents SoC at departure time $t^d$,
$p^t$ represents cost per unit of electricity at time t, and
t represents proxy for time of day pattern in EV arrival.

Thereafter, the state space value computed for each EV is used by the EV agent to decide an action value for the respective EV. The action value is one of a charging rate, and a discharging rate i.e., whether the EV should be charged or discharged is decided by the EV agent. Further, the system 300 implements an action on each EV based on the action value decided by the EV agent for the respective EV. Finally, the system computes a reward for each EV based on the action implemented on the respective EV using an EV reward algorithm. In an embodiment, the EV reward algorithm is a rule based algorithm that awards or penalizes the EV agent based on defined rules.

In an embodiment, the reward includes one of penalizing the EV agent in case slack variable constraints are not followed for the respective EV, and awarding the EV agent in case the slack variable constraints are followed for the respective EV. It should be noted that awarding of the EV agent represents that the EV agent is learning to minimize total cost of power drawn by the EVs in the EV-HVAC system.

The system 300 then trains the EV agent based on the computed reward using an EV training algorithm. In an embodiment, the EV training algorithm is a proximal policy optimization (PPO) algorithm.

So, mathematically EV agent $E^\theta$ decides the charging/discharging rate of an EV at time t, $A_{EV}{}^t = \{p^t\}$ and acts on an EV system to determine a next state and reward. The reward at t+1 as a result of taking the action $A^t = \{p^t\}$ is given by:

$$R_{EV}^{t+1} = \begin{cases} \text{Penalty, if}(\theta^{t+1} < \theta_{min}) \text{ or } (\theta^{t+1} > \theta_{max}) \text{ or } (l^{t+1} < 0), \\ 1 - \text{Normalized}[P^t \cdot p_t \cdot \Delta t], \quad \text{Otherwise} \end{cases}$$

At step 506 of the present disclosure, the hardware processors 304 of the system 300 determine an HVAC action to be performed on an HVAC equipment based on the received sensory information using a trained HVAC agent. The HVAC action includes one of a power to be drawn from a grid, and power to be drawn from at least one EV.

In at least one example embodiment, before using the trained HVAC agent, the system 300 determines whether the trained HVAC agent is available or not. In case the trained HVAC agent is available, the system 300 uses it for determining HVAC action for the HVAC equipment/unit. In case, the trained HVAC agent is not available, the system 300 first trains the HVAC agent based on the received sensory information, the pricing information and a discharge power of an EV system.

In an embodiment, for training the HVAC agent, the system 300 first computes a state space for the HVAC equipment based, at least in part, on the current room temperature, the ambient temperature, the discharge power of the EV system and a HVAC proxy for a time-of-day pattern in ambient temperature.

A state space i.e., state of HVAC at time t is a tuple $S_{HVAC}{}^t$ given by:

$$S_{HVAC}{}^t = \{T_a{}^t, T_\infty{}^t, P_d{}^t, p^t, t\}$$

Where, $T_a{}^t$ and $T_\infty{}^t$ represents current room and ambient room temperatures, respectively,
$P_d{}^t$ represents discharge power of the EV system, and
t represents proxy for a time-of-day pattern in ambient temperature.

The state space computed for the HVAC equipment is then used by the HVAC agent to decide an action to be taken on the HVAC equipment. In an embodiment, the action is one of a power to be drawn from the grid, and power to be drawn from the EV system. Thereafter, the system 300 implements the decided action on the HVAC equipment. Further, the system computes an HVAC reward for the implemented action using an HVAC reward algorithm. In an embodiment, the HVAC reward algorithm is a rule based algorithm that awards or penalizes the HVAC agent based on defined rules.

In an embodiment, the HVAC reward includes one of penalizing the HVAC agent in case the current room temperature is outside a recommended user comfort range, and awarding the HVAC agent in case the temperature is within the recommended user comfort range. It should be noted that awarding of the HVAC agent represents that the HVAC agent is learning to minimize total cost of power drawn from the grid for HVAC operation of the building.

The system 300 then trains the HVAC agent based on the computed HVAC reward using an HVAC training algorithm. In an embodiment, the HVAC training algorithm is a proximal policy optimization (PPO) algorithm.

So, mathematically action taken by HVAC agent $H^\omega$ at t, $A_{HVAC}{}^t = \{P_{HVAC}{}^t\}$, is the power to be drawn from the grid for HVAC operation. Because, the total power of the EV system is given as a state variable, $H^\omega$ learns over time to draw less power when there is more EV discharge at higher prices $p^t$ and vice versa. The reward at $R_{HVAC}{}^{t+1}$ is given by:

$$R_{HVAC}^{t+1} = \begin{cases} \text{Penalty, if}(T_a^{t+1} < 20° \text{ C.}) \text{ or } (T_a^{t+1} > 24° \text{ C.}), \\ 1 - \text{Normalized}[P_{HVAC}^t \cdot p_{t+1} \cdot \Delta t], \quad \text{Otherwise} \end{cases}$$

At step 208 of the present disclosure, the hardware processors 304 of the system 300 send the determined EV action to be performed on each EV of the one or more EVs, and the determined HVAC action to be performed on the HVAC equipment to the BMS. The BMS then implements the EV action determined for each EV on a respective EV and the HVAC action on the HVAC equipment to control the power consumption by the EV-HVAC system.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

As discussed earlier, conventionally the rule-based techniques and the model predictive control (MPC) systems have been used to minimize the power consumption of a building. However, the disadvantage of the rule based techniques and the model MPC systems is that these require accurate and well-calibrated system model to ensure optimal performance besides requiring period model calibration to factor in the uncertainties. To overcome the disadvantages, embodiments of the present disclosure provide the method and the system for jointly controlling electric vehicle-heating, ventilation, and air conditioning system of a building. More specifically, the system uses only one common EV agent for all the EVs instead of one agent per each EV, so the system scales readily with an increasing number of EVs. Further, the system balances the HVAC and EV charging KPIs with opportunistic power routing from V2B, thereby ensuring minimized power consumption by the HVAC system during the peak time of the day.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:

receiving, by a joint control system via one or more hardware processors, sensory information associated with a building, and pricing information from a building management system (BMS);

determining, by the joint control system via the one or more hardware processors, an electric vehicle (EV) action to be performed on each EV of one or more EVs based, at least in part, on the received sensory information and the pricing information using a trained EV agent, wherein the EV action comprises one of a: charging action; and discharging action, wherein the step of determining, by the joint control system via the one or more hardware processors, the EV action to be performed on each EV of the one or more EVs based, at least in part, on the received sensory information and the pricing information using the trained EV agent is preceded by:

determining, by the joint control system via the one or more hardware processors, whether the trained EV agent is available; and upon determining that the trained EV agent is not available, training, by the joint control system via the one or more hardware processors, an EV agent based on the sensory information and the pricing information by:

accessing, by the joint control system via the one or more hardware processors, the current SoC of each EV, the departure time of each EV, a required SoC at the departure time of each EV, the cost per unit of electricity at the current time and an EV proxy for a time-of-day pattern in arrival of EVs;

computing, by the joint control system via the one or more hardware processors, a slack variable for each EV based, at least in part, on the departure time of the respective EV and the required SoC at the departure time for the respective EV;

computing, by the joint control system via the one or more hardware processors, a state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern, wherein the state space value computed for each EV is used by the EV agent to decide an action value for the respective EV, and wherein the action value is one of:

a charging rate, and a discharging rate;

implementing, by the joint control system via the one or more hardware processors, an action on each EV based on the action value decided by the EV agent for the respective EV;

computing, by the joint control system via the one or more hardware processors, a reward for each EV based on the action implemented on the respective EV using an EV reward algorithm, wherein the reward comprises one of: penalizing the EV agent in case slack variable constraints are not followed for the respective EV, and awarding the EV agent in case the slack variable constraints are followed for the respective EV, and wherein the awarding of the EV agent represents that the EV agent is learning to minimize total cost of power drawn by the EVs in the EV-HVAC system; and training, by the joint control system via the one or more hardware processors, the EV agent based on the computed reward using an EV training algorithm;

determining, by the joint control system via the one or more hardware processors, a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV; and sending, by the joint control system via the one or more hardware processors, the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system.

2. The processor implemented method of claim 1, wherein the sensory information comprises one or more of: a current time, a current room temperature, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system, and wherein the pricing information comprises a cost per unit of electricity at the current time.

3. The processor implemented method of claim 1, wherein the step of determining, by the joint control system via the one or more hardware processors, the HVAC action to be performed on the HVAC equipment based on the received sensory information using the trained HVAC agent is preceded by:

determining, by the joint control system via the one or more hardware processors, whether the trained HVAC agent is available;

upon determining that the trained HVAC agent is not available, training, by the joint control system via the one or more hardware processors, an HVAC agent based, at least in part, on the sensory information, the pricing information and a discharge power of an EV system by:

computing, by the joint control system via the one or more hardware processors, a state space for the HVAC equipment based, at least in part, on the current room temperature, the ambient temperature, the discharge power of the EV system and a HVAC proxy for a time-of-day pattern in ambient temperature, wherein the state space computed for the HVAC equipment is used by the HVAC agent to decide an action to be taken on the HVAC equipment, and wherein the action is one of a:

power to be drawn from the grid, and power to be drawn from the EV system;

implementing, by the joint control system via the one or more hardware processors, the decided action on the HVAC equipment;

computing, by the joint control system via the one or more hardware processors, an HVAC reward for the implemented action using an HVAC reward algorithm, wherein the HVAC reward comprises one of: penalizing the HVAC agent in case the current room temperature is outside a recommended user comfort range, and awarding the HVAC agent in case the temperature is within the recommended user comfort range, and wherein the awarding of the HVAC agent represents that the HVAC agent is learning to minimize total cost of power drawn from the grid for HVAC operation of the building; and training, by the joint control system via the one or more hardware processors, the HVAC agent based on the computed HVAC reward using an HVAC training algorithm.

4. A joint control system, comprising:

a memory storing instructions;

one or more communication interfaces; and one or more hardware processors coupled to the memory via the one or more communication interfaces, wherein the one or more hardware processors are configured by the instructions to:

receive sensory information associated with a building, and pricing information from a building management system (BMS);

determine an electric vehicle (EV) action to be performed on each EV of one or more EVs based, at least in part, on the received sensory information and the pricing information using a trained EV agent, wherein the EV action comprises one of a:

charging action; and discharging action, wherein prior to determining the EV action to be performed on each EV of the one or more EVs based, at least in part, on the received sensory information and the pricing information using the trained EV agent, the one or more hardware processors are configured by the instructions to:

determine whether the trained EV agent is available;

upon determining that the trained EV agent is not available, train an EV agent based on the sensory information and the pricing information by:

accessing the current SoC of each EV, the departure time of each EV, a required SoC at the departure time of each EV, the cost per unit of electricity at the current time and an EV proxy for a time-of-day pattern in arrival of EVs;

computing a slack variable for each EV based, at least in part, on the departure time of the respective EV and the required SoC at the departure time for the respective EV;

computing a state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern, wherein the state space value computed for each EV is used by the EV agent to decide an action value for the respective EV, and wherein the action value is one of:

a charging rate, and a discharging rate;

implementing an action on each EV based on the action value decided by the EV agent for the respective EV;

computing a reward for each EV based on the action implemented on the respective EV using an EV reward algorithm, wherein the reward comprises one of: penalizing the EV agent in case slack variable constraints are not followed for the respective EV, and awarding the EV agent in case the slack variable constraints are followed for the respective EV, and wherein the awarding of the EV agent represents that the EV agent is learning to minimize total cost of power drawn by the EVs in the EV-HVAC system; and training the EV agent based on the computed reward using an EV training algorithm;

determine a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV; and send the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system.

5. The joint control system of claim 4, wherein the sensory information comprises one or more of: a current time, a current room temperature, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system, and wherein the pricing information comprises a cost per unit of electricity at the current time.

6. The joint control system of claim 4, wherein prior to determining the HVAC action to be performed on the HVAC equipment based on the received sensory information using the trained HVAC agent, the one or more hardware processors are configured by the instructions to:

determine whether the trained HVAC agent is available; upon determining that the trained HVAC agent is not available, train an HVAC agent based, at least in part, on the sensory information, the pricing information and a discharge power of an EV system by:

computing a state space for the HVAC equipment based, at least in part, on the current room temperature, the ambient temperature, the discharge power of the EV system and a HVAC proxy for a time-of-day pattern in ambient temperature, wherein the state space computed for the HVAC equipment is used by the HVAC agent to decide an action to be taken on the HVAC equipment, and wherein the action is one of a: power to be drawn from the grid, and power to be drawn from the EV system;

implementing the decided action on the HVAC equipment;

computing an HVAC reward for the implemented action using an HVAC reward algorithm, wherein the HVAC reward comprises one of: penalizing the HVAC agent in case the current room temperature is outside a recommended user comfort range, and awarding the HVAC agent in case the temperature is within the recommended user comfort range, and wherein the awarding of the HVAC agent represents that the HVAC agent is learning to minimize total cost of power drawn from the grid for HVAC operation of the building; and training the HVAC agent based on the computed HVAC reward using an HVAC training algorithm.

7. One or more non-transitory machine-readable information storage mediums comprising one or more instructions which when executed by one or more hardware processors cause:

receiving, by a joint control system, sensory information associated with a building, and pricing information from a building management system (BMS);

determining, by the joint control system, an electric vehicle (EV) action to be performed on each EV of one or more EVs based, at least in part, on the received sensory information and the pricing information using a trained EV agent, wherein the EV action comprises one of a: charging action; and discharging action, wherein the step of determining, by the joint control system, the EV action to be performed on each EV of the one or more EVs based, at least in part, on the received sensory information and the pricing information using the trained EV agent is preceded by:

determining, by the joint control system, whether the trained EV agent is available; and upon determining that the trained EV agent is not available, training, by the joint control system, an EV agent based on the sensory information and the pricing information by:

accessing, by the joint control system, the current SoC of each EV, the departure time of each EV, a required SoC at the departure time of each EV, the cost per unit of electricity at the current time and an EV proxy for a time-of-day pattern in arrival of EVs;

computing, by the joint control system, a slack variable for each EV based, at least in part, on the departure time of the respective EV and the required SoC at the departure time for the respective EV;

computing, by the joint control system, a state space value for each EV based, at least in part, on the computed slack variable of the respective EV, the current SoC of the respective EV, the departure time of the respective EV, the required SoC at the departure time of the respective EV, the cost per unit of electricity at the current time, and the proxy for the time-of-day pattern, wherein the state space value computed for each EV is used by the EV agent to decide an action value for the respective EV, and wherein the action value is one of: a charging rate, and a discharging rate;

implementing, by the joint control system, an action on each EV based on the action value decided by the EV agent for the respective EV;

computing, by the joint control system, a reward for each EV based on the action implemented on the respective EV using an EV reward algorithm, wherein the reward comprises one of: penalizing the EV agent in case slack variable constraints are not followed for the respective EV, and awarding the EV agent in case the slack variable constraints are followed for the respective EV, and wherein the awarding of the EV agent represents that the EV agent is learning to minimize total cost of power drawn by the EVs in the EV-HVAC system; and training, by the joint control system, the EV agent based on the computed reward using an EV training algorithm;

determining, by the joint control system, a heating, ventilation and air conditioning (HVAC) action to be performed on an HVAC equipment based on the received sensory information using a trained HVAC agent, wherein the HVAC action comprises one of a: power to be drawn from a grid, and power to be drawn from at least one EV; and sending, by the joint control system, the determined EV action to be performed on each EV of the one or more EVs, and the determined HVAC action to be performed on the HVAC equipment to the BMS, wherein the BMS implements the EV action determined for each EV on a respective EV and the HVAC action on the HVAC equipment to control the power consumption by the EV-HVAC system.

8. The one or more non-transitory machine readable information storage mediums of claim 7, wherein the sensory information comprises one or more of: a current time, a current room temperature, an ambient temperature, occupancy information, a state of charge (SoC) of each electric vehicle (EV) of one or more electric vehicles (EVs) at current time, an arrival time of each EV, a departure time of each EV, and a power drawn by an electric vehicle-heating, ventilation, and air conditioning system (EV-HVAC) system, and wherein the pricing information comprises a cost per unit of electricity at the current time.

9. The one or more non-transitory machine readable information storage mediums of claim 7, wherein the step of determining, by the joint control system, the HVAC action to be performed on the HVAC equipment based on the received sensory information using the trained HVAC agent is preceded by:

determining, by the joint control system, whether the trained HVAC agent is available;

upon determining that the trained HVAC agent is not available, training, by the joint control system, an HVAC agent based, at least in part, on the sensory information, the pricing information and a discharge power of an EV system by:

computing, by the joint control system, a state space for the HVAC equipment based, at least in part, on the current room temperature, the ambient temperature, the discharge power of the EV system and a HVAC proxy for a time-of-day pattern in ambient temperature, wherein the state space computed for the HVAC equipment is used by the HVAC agent to decide an action to be taken on the HVAC equipment, and wherein the action is one of a: power to be drawn from the grid, and power to be drawn from the EV system;

implementing, by the joint control system, the decided action on the HVAC equipment;

computing, by the joint control system, an HVAC reward for the implemented action using an HVAC reward algorithm, wherein the HVAC reward comprises one of: penalizing the HVAC agent in case the current room temperature is outside a recommended user comfort range, and awarding the HVAC agent in case the temperature is within the recommended user comfort range, and wherein the awarding of the HVAC agent represents that the HVAC agent is learning to minimize total cost of power drawn from the grid for HVAC operation of the building; and training, by the joint control system, the HVAC agent based on the computed HVAC reward using an HVAC training algorithm.

* * * * *